(12) United States Patent
Wu (10) Patent No.: US 8,731,244 B2
(45) Date of Patent: May 20, 2014

(54) SYSTEMS AND METHODS FOR IMPROVING IMAGE RECOGNITION

(75) Inventor: Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 263 days.

(21) Appl. No.: 13/193,287

(22) Filed: Jul. 28, 2011

(65) Prior Publication Data
US 2013/0028481 A1 Jan. 31, 2013

(51) Int. Cl.
*G06K 9/00* (2006.01)

(52) U.S. Cl.
USPC ........................................... 382/105

(58) Field of Classification Search
USPC ............ 382/105, 173, 299; 340/933; 345/427
See application file for complete search history.

(56) References Cited

U.S. PATENT DOCUMENTS

| | | | |
|---|---|---|---|
| 6,473,517 B1 * | 10/2002 | Tyan et al. | 382/105 |
| 6,553,131 B1 * | 4/2003 | Neubauer et al. | 382/105 |
| 2004/0223662 A1 * | 11/2004 | Urano et al. | 382/299 |
| 2004/0240737 A1 * | 12/2004 | Lim et al. | 382/182 |
| 2005/0179688 A1 * | 8/2005 | Chernichenko et al. | 345/427 |
| 2005/0180632 A1 * | 8/2005 | Aradhye et al. | 382/182 |
| 2006/0278705 A1 * | 12/2006 | Hedley et al. | 235/384 |
| 2008/0136943 A1 * | 6/2008 | Azuma | 348/231.99 |
| 2010/0278389 A1 * | 11/2010 | Tsai et al. | 382/105 |
| 2012/0148105 A1 | 6/2012 | Burry et al. | |

* cited by examiner

*Primary Examiner* — Amara Abdi
(74) *Attorney, Agent, or Firm* — MH2 Technology Law Group LLP (57) ABSTRACT

An embodiment generally relates to systems and methods for processing license plate image data. A processing module can receive an image comprising a license plate and, from the image, localize a region of the license plate itself. The license plate region can be extracted and license plate distortion parameters can be inferred. The image can be geometrically corrected using the inferred license plate distortion parameters, and the license plate image can be iteratively sharpened to optimize the quality of the license plate image. Further, processing parameters can be modified and applied to the image data in a feedback-based loop for further optimization.

18 Claims, 4 Drawing Sheets

SYSTEMS AND METHODS FOR IMPROVING IMAGE RECOGNITION

FIELD OF THE INVENTION

This invention relates generally to imaging and, more particularly, to systems and methods for processing license plate image data.

BACKGROUND OF THE INVENTION

As a result of increased urbanization, population density, motorization, and general population, traffic congestion has been increasing on transport infrastructures. The increased traffic congestion has impacted the efficiency of travel, air pollution, and fuel consumption. As a result, current transport infrastructure systems are aiming to transition to more intelligent transport systems (ITS) in an effort to manage vehicles, routes, loads, safety measures, fuel consumption, transportation times, and other factors.

One effort of ITS is the implementation and improvement of traffic enforcement cameras, which are used to detect and identify vehicles based on license plate data, such as numbers, characters, states, and other data. For example, some uses of traffic enforcement cameras include toll collection interchanges or booths, speed limit violations, red light violations, bus lane enforcement, level crossing enforcement, high-occupancy vehicle enforcement, turn lane violations, and other uses.

Current automatic license plate recognition (ALPR) systems face challenges due to complications in sensing, weather conditions, and other factors. As a result, a typical state-of-the-art (SOTA) ALPR system imposes specifications on cameras or image quality, camera installation geometry, allowable vehicle speed range, states within scope, and other specifications, to guarantee an acceptable level of performance. Therefore, it may be desirable to have systems and methods for improving the performance of ALPR systems. In particular, it may be desirable to have systems and methods for implementing image preprocessing and closed-loop feedback to improve detection techniques.

SUMMARY

An embodiment pertains generally to a method of processing image data. The method comprises detecting image data comprising an image of a license plate and examining the image data to localize a region of the license plate within the image. In embodiments, the region of the license plate can be processed to determine a set of distortion parameters for the license plate. Further, the method comprises applying the set of distortion parameters to the image data to enhance the image of the license plate.

Another embodiment pertains generally to a system for processing image data. The system comprises a processor coupled to memory and configured to detect image data comprising an image of a license plate and examine the image data to localize a region of the license plate within the image. In embodiments, the region of the license plate can be processed to determine a set of distortion parameters for the license plate. Further, the processor is configured to apply the set of distortion parameters to the image data to enhance the image of the license plate.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

As used herein, "optimize" or variations thereof can be a general term that can refer to the best available option. In other words, an "optimized" configuration need not represent the best possible configuration, but instead can mean the preferred configuration of the possible configurations. Further, the term "optimize" can also mean maximize, enhance, improve, or other terms related to a preferred or improved performance level.

Embodiments generally relate to systems and methods for processing license plate image data. More particularly, a processing module or other logic can process digital or analog image data in accordance with the techniques as described herein. In embodiments, the processing module can be configured to globally or locally enhance the image data and localize a license plate region within the image. According to aspects, the processing module can be configured to extract and enhance each license plate region, infer or estimate license plate distortion parameters, and perform geometric corrections for each license plate image based on the estimated distortion parameters. Further, in embodiments, the processing module can resize each license plate image to a pre-determined range, or other ranges, and iteratively sharpen each license plate image to optimize a quality of the license plate.

In further embodiments, the processing module can be configured to perturb or otherwise modify one or more parameters associated with the image data processing to obtain another version of the license plate image(s), run an automatic license plate recognition (ALPR) analysis on the license plate image(s), and repeat the process until an acceptable threshold or level has been reached or maximized, until a maximum number of iterations has been reached, or other metrics. The feedback loop processing as discussed herein can result in a formulation of actuation signals that are appropriate for license plate distortion and/or degradation.

Figure 1:
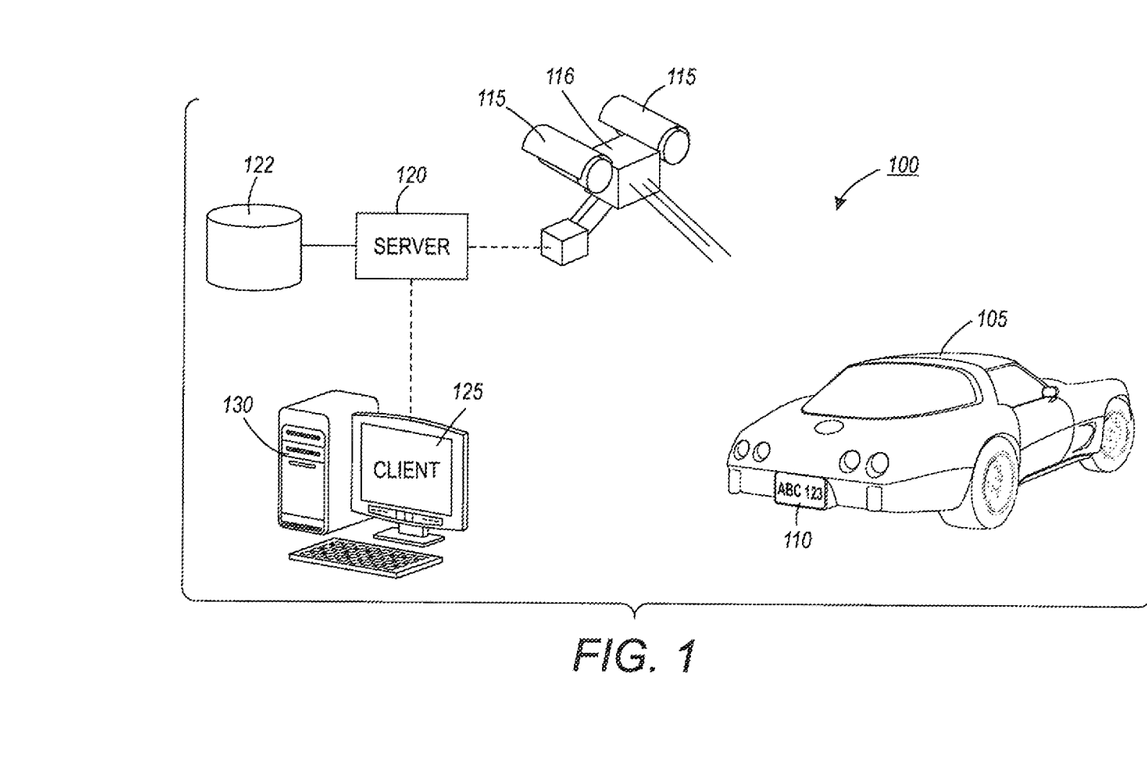
FIG. 1 illustrates an exemplary system for obtaining image data in accordance with embodiments.

FIG. 1 depicts an exemplary environment 100 in which an ALPR system can be implemented, in accordance with embodiments. It should be readily apparent to one of ordinary skill in the art that the environment 100 depicted in FIG. 1 represents a generalized schematic illustration and that other components can be added or existing components can be removed or modified.

As shown in FIG. 1, the environment 100 can comprise a vehicle 105 comprising a license plate 110. Further, the environment 100 can comprise one or more cameras 115 that can be positioned or oriented in such that they can be directed towards or otherwise configured to capture the information on the license plate 110. For example, the cameras 115 can be positioned at, on, or near toll interchanges or booths, police or other law enforcement vehicles, intersection traffic lights, traffic lanes, interstate highways, and other locations. Further, the cameras 115 can capture images of the license plate 110 in order to regulate and/or enforce, for example, toll collection interchanges or booths, speed limit violations, red light violations, bus lane enforcement, level crossing enforcement, high-occupancy vehicle enforcement, turn lane violations, and other uses. In embodiments, the cameras 115 can be configured with at least one light 116 that can be configured to illuminate an area in which the vehicle 105 is driving, such as in low light or night environments, in order to aid in the image capture of the license plate 110. In embodiments, the light 116 can be a visible light, infrared light, or other form of light.

In embodiments, the cameras 115 can be configured to connect to a server 120. For example, the cameras 115 can transmit image data of the license plate 110, or other images, to the server 120 for processing or storage on, for example, a database 112 or other type of storage. In embodiments, the server 120 can be connected locally to or remotely from the cameras 115. For example, the cameras 115 can be located on a police vehicle and the server 120 can be located at a remote entity or station. Further, in embodiments, the cameras 115 can be configured to transmit image data to the server 120 via any type of hardwired, wireless, cellular, satellite, or other type of data network.

In embodiments, the server 120 can be coupled to and/or can be configured to connect to a client machine 125. Further, in embodiments, the server 120 can be configured to provide the client 125 with image data captured by the cameras 125, or other data. In embodiments, the client machine 125 can be a part of the server 120. The server 120 can be configured to transmit image data to the client 125 via any type of hardwired, wireless, cellular, satellite, or other type of data network. In embodiments, the client 125 can comprise a processing module 130 that can be any type of hardware, software, application, or other processing entity that can be configured to be executed on the client 125 and perform analyses on the received image data, or other data.

Figure 2A:
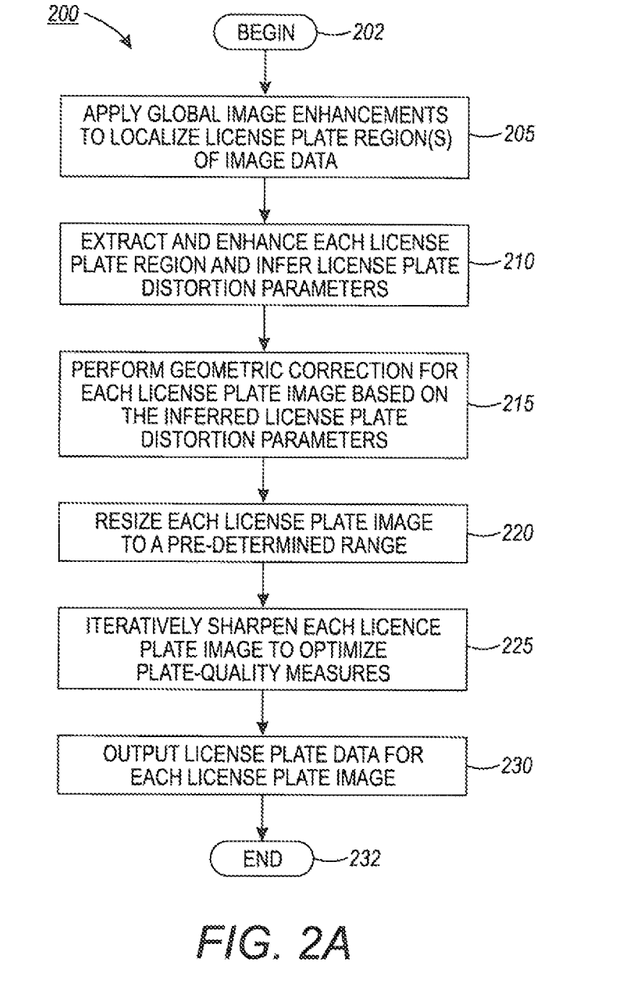
FIG. 2A illustrates an exemplary flow diagram of processing imaging data in accordance with embodiments.

FIG. 2A illustrates a flow diagram of an imaging preprocessing technique 200 according to embodiments. It should be readily apparent to those of ordinary skill in the art that the flow diagram depicted in FIG. 2A represents a generalized illustration and that other steps can be added or existing steps can be removed or modified.

In embodiments, the processing module 130 or other logic can be configured to perform the image preprocessing technique 200 on image data received from the cameras 115 or from other entities, in order to improve license plate recognition within the image data. Due to lighting condition changes, motion blur, and other factors, the license plate in the image data can be difficult to locate. In 202, processing can begin. In 205, the processing module 130 can apply global image enhancements to localize license plate region(s) of the image data. For example, the global image enhancements can be histogram equalization, tone-reproduction-curve shaping, or other enhancements, while localizing the license plate region. In other examples, the global enhancements can use thresholding filtering steps, morphological filtering steps, or a combination thereof, with pre-determined parameters, to find potential license plate regions. In embodiments, once the license plate regions are roughly localized, the processing module 130 can perform a histogram equalization on the image data to further enhance the license plate image.

In 210, the processing module 130 can extract and enhance each license plate region, and infer license plate distortion parameters. In operation, there can be non-optimal plate image acquisition techniques due to limitations and obstacles. For example, the focus and optimal camera position may be at the center of a toll lane, about 20 feet away from vehicles traveling under 5 miles/hour. However, not all vehicles have license plates in the middle of the car, or travel less than 5 miles/hour. Therefore, the license plate distortion parameters may need to be calculated to account for variances in vehicle appearance and operation. Furthermore, in the some applications such as speed enforcement, cameras can be mounted on a pole or similar structure along the side of the road. This configuration can impose even more geometric distortion on the acquired plate images.

In embodiments, the processing module 130 can be configured to identify or calculate the following license plate distortion parameters: rotation angle ($\theta_1$), skew, translation, motion and/or optical blur, and others. The rotation angle ($\theta_1$) can be derived directly from a license plate image or provided as a known parameter in the setup or configuration of the camera 115. In embodiments, the remaining distortion parameters can be limited to a projective distortion, such as for a fixed field-of-view camera, or other cameras. As understood herein, the license plate distortion parameters can be separated into geometric distortion parameters resulting from the positioning of the license plate relative to any cameras, such as rotation angles of license plate images, and other distortion parameters such as motion and optic blur.

Figure 2B:
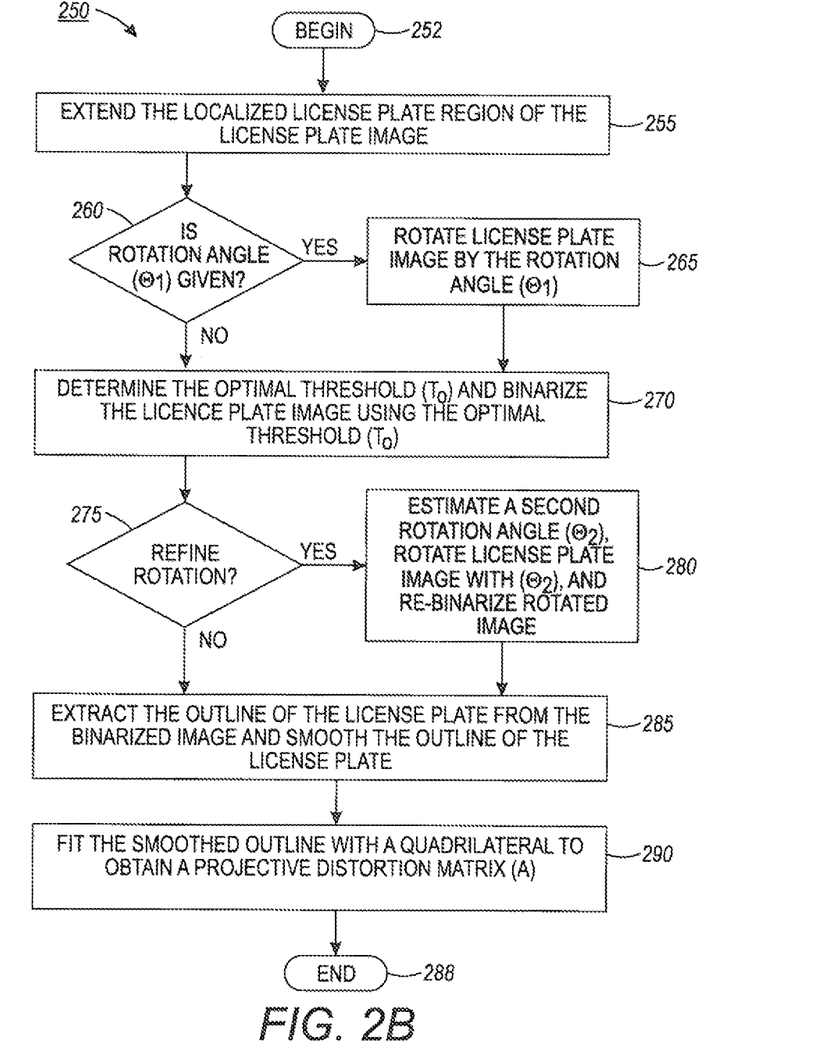
FIG. 2B illustrates an exemplary flow diagram of processing imaging data in accordance with another embodiment.

Referring to FIG. 2B, depicted is a flowchart detailing a technique 250 used to extract, enhance, and/or estimate geometric distortion parameters for the license plate image, as referenced in 210. It should be readily apparent to those of ordinary skill in the art that the flow diagram depicted in FIG. 2B represents a generalized illustration and that other steps can be added or existing steps can be removed or modified.

In 252, processing can begin. In 255, the localized license, plate region of the image can be extended. In embodiments, the region can be extended by a set or variable number of pixels, such as, for example, 5 pixels, and can be chosen based on a performance of the license plate localization on a training set of data. In 260, the processing module 130 or other logic can determine if the rotation angle ($\theta_1$) is given. If the rotation angle ($\theta_1$) is given, then processing can proceed to 265 in which the license plate image is rotated by an angle equivalent to the rotation angle ($\theta_1$), and processing can proceed to 270. If, on the other hand, the rotation angle ($\theta_1$) is not given, then processing can proceed to 270 in which the optimal threshold ($T_o$) can be determined, and the license plate image can be binarized using the optimal threshold ($T_o$). In embodiments, the optimal threshold ($T_o$) can be determined such that the resulting binary image is the most convex, or other measures.

In 275, it can be determined whether to further refine the image rotation correction. In embodiments, the determination can be made automatically, or a user or administrator can specify to further refine the image rotation correction via, for example, a user interface. If the image is selected to be further refined, then processing can proceed to 280 in which a second rotation angle ($\theta_2$) of the resulting binarized image can be estimated, the license plate image can be rotated with the second rotation angle ($\theta_2$), and the rotated image can be re-binarized. This refinement of rotation can be especially beneficial when a rotation angle ($\theta_1$) is not given earlier. In embodiments, the second rotation angle ($\theta_2$) can be estimated using a principal component analysis (PCA) on the xy-coordinates of all of the foreground pixels of the license plate image to find an orientation of the major axis. Processing can then proceed to 285. In contrast, if the image is not selected to be further refined, then processing can proceed to 285.

In 285, the outline of the license plate can be extracted from the binarized image, and smoothed. In embodiments, the outline can be smoothed by representing the outline with Fourier descriptors, keeping only a certain amount (e.g. 56, or other values) of the most significant descriptors, and converting these most significant descriptors back to a spatial domain. It should be appreciated that other curve smoothing techniques can be utilized. In 290, the license plate outline that was smoothed can be fit with a quadrilateral, parallelogram, or other shapes, to obtain a projective distortion matrix (A). In embodiments, to approximate the corners of the quadrilateral or parallelogram, the data from four (4) segments of the license plate outline (e.g. near 0°, 90°, 180°, and 270°, or other segments) can be selected to fit four (4) least-square lines that touch or nearly touch the license plate outline. Further, a numerical optimization method can be applied to refine the locations of the corners of the quadrilateral or parallelogram, wherein the optimization criterion can be to minimize the total least-squares errors of the outline to the fitted quadrilateral or parallelogram after excluding a percentage (e.g. 10% or other values) of the largest errors. The reason of excluding a percentage of data is to match the fact that the corners of license plates can be round and smooth, unlike conventional quadrilaterals or parallelograms. Furthermore, the exclusion results in the fitting being robust against imaging defects that may appear on the acquired license plate images. In embodiments, the percentage can be determined dynamically based on a histogram of errors from an initial guess and "Otsu's method." In 288, processing can end, repeat, or return to any of the previous steps.

Referring back to FIG. 2A, after each license plate region is extracted and enhanced, and after the geometric distortion parameters are inferred or estimated, processing can proceed to 215 in which geometric correction can be performed on each license plate image based on the inferred geometric distortion parameters. In embodiments, each license plate image can be corrected by rotating the image by a rotation angle $\theta_3=(\theta_1+\theta_2)$, and by un-distorting the rotated image by the projection distortion matrix (A). In 220, each license plate image can be resized to a pre-determined range. In particular, the width of the bounding box of the geometric corrected license plate image can be resized to a pre-determined number of pixels (e.g. 154 pixels, or other values), thus making the resulting license plate image a uniform width regardless of the width of the original plate image. The processing of 220 is performed because some ALPRs can have parameters on character width and height range, and resizing the license plate image can move the license plate image into a nominal size range in which the ALPRs operate. Further, normalizing the license plate size can simplify the image sharpening step in which a plate-quality measure is used.

In 225, each license plate image can be iteratively sharpened to optimize a given plate-quality measure. In embodiments, an unsharp masking in a predetermined size (e.g. 3×3, or other values) with an adjustable gain ($\alpha$) and a wiener filter with a blur vector of [$m_b$, $n_b$], wherein $m_b$ is the pixel blur in a vertical direction and $n_b$ is the pixel blur in a horizontal direction, and a noise variance ($\sigma$) for sharpening, can be used for the optimization. Further, to optimize a simple plate-quality metric, which can be a weighted sum of noise variance and an average strong edge strength in the license plate character region, an iterative search can be performed over ($\alpha$, $m_b$, $n_b$, $\sigma$). In some cases in which only the license plate character region is focused, the noise variance ($\sigma$) can be approximated by the square of the simple standard-deviation of an image intensity. The processing of 225 is performed to manage other distortion parameters of, for example, out-of-focus images, images that are motion-blurred, or other types of defects or inconsistencies.

As discussed here, the plate-quality measures can be any type of measure that can be used to gauge an accuracy of license plate recognition techniques. In embodiments, the plate-quality measures can be based on spatial resolution, sharpness, contrast, lighting conditions, position, angle of view, and other Metrics. In other embodiments, the plate-quality measures can be confidence Measures from an Optical Character Recognition (OCR) module which can recognize alpha-numerical numbers of license plates. Further, in embodiments, the plate-quality measures can give an indication of accuracy percentage, or the confidence with which the license plate data output from the processing module 130 matches the actual data of the license plate 110. In 230, license plate data cane be output for each license plate image. In embodiments, the processing module 130 or other logic can provide an indication of a state or other jurisdiction corresponding to the license plate (e.g. "New York", "Maryland," etc.), as well as the actual data or code of the license plate (e.g. "ABC 123"). In embodiments, the processing module 130 can be configured to provide reports, charts, and/or other types of graphics. For example, the processing module 130 can display, for a user, administrator, or other entity, via a graphical user interface, processed data of a license plate image. For further example, the processing module 130 can compile data from a series of images, and provide the compiled data in a data file, e-email, or other form of data or communication. In 232, processing can end, repeat, or return to any of the previous steps.

In some cases, the determination and calculation of license plate quality metrics as discussed in FIGS. 2A and 2B can exhibit a lack of optimum accuracy. Therefore, a feedback loop technique can be used on the data to further improve the accuracy of ALPR systems. More particularly, an ALPR technique can be performed on an initial plate image, such as an image acquired by the camera 115 or an image that was preprocessed with techniques as discussed in FIGS. 2A and 2B. Based on the output result of the ALPR technique, parameters of the image preprocessing can be perturbed to obtain an additional version of the license plate image, the ALPR technique can be applied to the additional version, and the process can repeat until an acceptable ALPR result has been reached, maximized, or a maximum number of iterations has been reached. It should be appreciated that the feedback loop processing can be performed any number of times, and can be controlled automatically or manually by an administrator or other entity.

In embodiments, license plate distortion and image degradation can be corrected by projective correction, including rotation; and de-blurring, such as unsharp masking, motion-deblur, and other techniques; if the image preprocessing parameters are known and accurate. Because image manipulation offers many dimensions irrelevant to plate distortion, it can be beneficial to parameterize the space and limit it to a distortion relevant to ALPR. In embodiments, the projective distortion matrix (A) can be formulated as equation (1):

$$A = \begin{bmatrix} \cos\theta & \sin\theta & 0 \\ -\sin\theta & \cos\theta & 0 \\ 0 & 0 & 1 \end{bmatrix} \begin{bmatrix} s_x & 0 & 0 \\ 0 & s_y & 0 \\ 0 & 0 & 1 \end{bmatrix} \begin{bmatrix} 1 & 0 & 0 \\ \beta_x & 1 & 0 \\ 0 & 0 & 1 \end{bmatrix} \begin{bmatrix} 1 & \beta_y & 0 \\ 0 & 1 & 0 \\ 0 & 0 & 1 \end{bmatrix} \begin{bmatrix} 1 & 0 & 0 \\ 0 & 1 & 0 \\ \delta_x & \delta_y & 1 \end{bmatrix} \quad (1)$$

As shown in equation (1), the matrix (A) can be decomposed into a combination of rotation ($\theta$), scaling ($s_x$, $s_y$), shear in x and ($\beta_x$, $\beta_y$), and translations ($\delta_x$, $\delta_y$), to allow for actuation or searching in a parameterized space. In embodiments, de-blurring parameters (e.g. $\alpha$, $m_b$, $n_b$, $\sigma$, and others) can be used for a gain of unsharp masking, and motion-vector and noise-variation of motion-deblur. In overall embodiments, the processing module 130 or other logic can take image manipulation inputs ($\theta$, $s_x$, $s_y$, $\beta_x$, $\beta_y$, $\delta_x$, $\delta_y$, $\alpha$, $m_b$, $n_b$, $\sigma$) and a localized/enhanced plate image, such as the original license plate image or an image from a previous iteration, and output a perturbed version of a license plate image ready for the ALPR system.

In embodiments, once a measurement system, such as a license plate confidence score, and an actuator, such as the perturbed license plate image creator, are in place, the processing module 130 or other logic can estimate a subsequent actuation signal that can improve the performance of the image processing iteratively. In one example, the processing module 130 can use the plate confidence score, or how accurate the processed license plate data is to the actual license plate data, offered by an ALPR system for the optimization. In particular, an intermediate set of results from an enhanced and localized license plate image, such as a set that has been processed in accordance with the techniques discussed in FIGS. 2A and 2B, can be examined. If the optimal threshold ($T_o$) meets a threshold amount, such as, for example, 900, or other figures, then the processing can stop. Otherwise, if the optimal threshold ($T_o$) is less than the threshold amount, then a grid of image manipulation parameters ($\theta$, $s_x$, $s_y$, $\beta_x$, $\beta_y$, $\delta_x$, $\delta_y$, $\alpha$, $m_b$, $n_b$, $\sigma$) can be input into an initial range of interest to create a set of perturbed images, which can be passed to an ALPR system.

Next, the ALPR system can store the one of the set of perturbed images with the maximal plate confidence score and the overall range of the plate confidence scores in the set. Further, the processing on the set of perturbed images can be repeated with a modified finer range near the parameter(s) that yields the current maximal plate confidence score until a stopping criterion is met. For example, the stopping criterion can be an allowable maximal number of iterations, a convergence, or other criterion.

For further example, the processing module 130 can use individual character confidence scores, or confidence scores for each of the characters in a license plate, from different perturbed images to generate the final optimal license plate output. Further, for example, the processing module 130 can examine individual character confidence scores while also setting a minimal threshold on an overall license plate confidence score to maximize the score of each character but only when a given perturbed image has a reasonable overall license plate confidence score.

Figure 3:
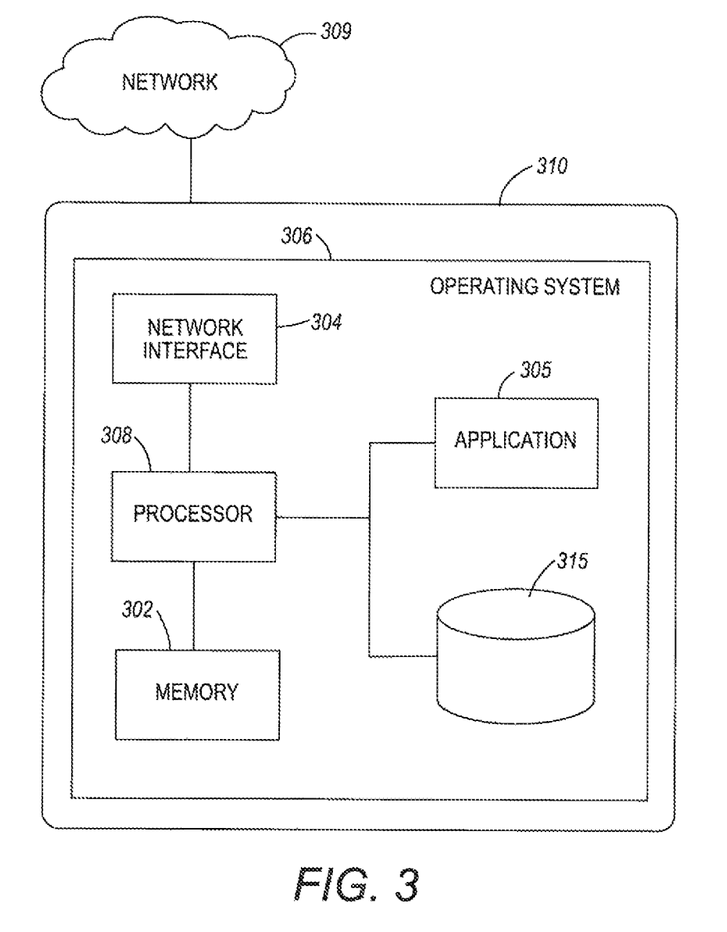
FIG. 3 illustrates a hardware diagram in accordance with another embodiment.

FIG. 3 illustrates an exemplary diagram of hardware and other resources that can be incorporated with processing and logic associated with the present embodiments. As shown in FIG. 3, a server 310 can be configured to communicate with a network 309. In embodiments as shown, the server 310 can comprise a processor 308 communicating with memory 302, such as electronic random access memory, or other forms of transitory or non-transitory computer readable storage mediums, operating under control of or in conjunction with an operating system 306. The operating system 306 can be any commercial, open-source, or proprietary operating system or platform. The processor 308 can communicate with a database 315, such as a database stored on a local hard drive. While illustrated as a local database in the server 310, the database 315 can be separate from the server 310.

The processor 308 can further communicate with a network interface 304, such as an Ethernet or wireless data connection, which in turn communicates with the network 309, such as the Internet or other public or private networks. The processor 308 can also communicate with the database 315 or any applications 305, such as applications associated with the processing module 130, to execute control logic and perform image data processing, as described herein.

While FIG. 3 illustrates the server 310 as a standalone system comprising a combination of hardware and software, the server 310 can also be implemented as a software application or program capable of being executed by a conventional computer platform. For example, it should be understood that the components of the server 310 can be implemented on user PCs or other hardware such that the user PCs can communicate directly with the database 315. Likewise, the server 310 can also be implemented as a software module or program module capable of being incorporated in other software applications and programs. In either case, the server 310 can be implemented in any type, of conventional proprietary or open-source computer language.

Certain embodiments can be performed as a computer program. The computer program can exist in a variety of forms both active and inactive. For example, the computer program can exist as software program(s) comprised of program instructions in source code, object code, executable code or other formats; firmware program(s); or hardware description language (HDL) files. Any of the above can be embodied on a transitory or non-transitory computer readable medium, Which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of processing data, the method comprising:
   detecting image data comprising an image of a license plate;
   localizing a region of the license plate within the image;
   processing, by a processor, the region of the license plate to determine a set of distortion parameters for the license plate, wherein the processing comprises:
      determining an optimal threshold, wherein determining the optimal threshold comprises determining a threshold that generates a binary image with a maximized convexity;
      binarizing the image data based on the optimal threshold to generate a first binarized image; and
      processing the first binarized image to determine a rotation angle; and
   applying the set of distortion parameters to the image data to enhance the image of the license plate, wherein applying the set of distortion parameters comprises:
      rotating the image based on the rotation angle to generate a rotated image; and
      binarizing the rotated image to generate a second binarized image.

2. The method of claim 1, further comprising:
   modifying the set of distortion parameters based on a confidence measure; and
   applying the set of distortion parameters that was modified to the image data.

3. The method of claim 2, wherein the modifying and the applying are repeated a set number of times or until a threshold result is reached.

4. The method of claim 1, further comprising:
   extracting license plate data from the image of the license plate that was enhanced; and
   providing the license plate data to a user.

5. The method of claim 1, wherein applying the set of distortion parameters to the image data to enhance the image of the license plate further comprises:
   performing a geometric correction on the image of the license plate to generate a corrected image;
   resizing the corrected image to a set range; and
   processing the corrected image that was resized to enhance a quality of the corrected image that was resized.

6. The method of claim 1, wherein processing the region of the license plate to determine the set of distortion parameters further comprises:
   prior to binarizing the image data based on the optimal threshold, rotating the image of the license plate by a first rotation angle;
   extracting an outline of the license plate from the second binarized image; and
   smoothing the outline of the license plate using Fourier descriptors.

7. The method of claim 6, wherein processing the region of the license plate to determine the set of distortion parameters further comprises fitting the outline of the license plate that was smoothed with a quadrilateral.

8. The method of claim 6, wherein the rotation angle is derived from the image of the license plate.

9. The method of claim 1, further comprising processing the region of the license plate with a histogram equalization.

10. A system for processing data, the system comprising:
    a processor coupled to memory and configured to perform actions comprising:
       detecting image data comprising an image of a license plate;
       localizing a region of the license plate within the image;
       processing, by a processor, the region of the license plate to determine a set of distortion parameters for the license plate, wherein the processing comprises:
          determining an optimal threshold, wherein determining the optimal threshold comprises determining a threshold that generates a binary image with a maximized convexity;
          binarizing the image data based on the optimal threshold to generate a first binarized image; and
          processing the first binarized image to determine a rotation angle; and
       applying the set of distortion parameters to the image data to enhance the image of the license plate, wherein applying the set of distortion parameters comprises:
          rotating the image based on the rotation angle to generate a rotated image; and
          binarizing the rotated image to generate a second binarized image.

11. The system of claim 10, wherein the processor is further configured to perform actions comprising:
    modifying the set of distortion parameters based on a confidence measure; and
    applying the set of distortion parameters that was modified to the image data.

12. The system of claim 11, wherein the modifying and the applying are repeated a set number of times or until a threshold result is reached.

13. The system of claim 10, wherein the processor is further configured to perform actions comprising:
    extracting license plate data from the image of the license plate that was enhanced; and
    providing the license plate data to a user.

14. The system of claim 10, wherein applying the set of distortion parameters to the image data to enhance the image of the license plate further comprises:

performing a geometric correction on the image of the license plate to generate a corrected image;

resizing the corrected image to a set range; and processing the corrected image that was resized to enhance a quality of the corrected image that was resized.

15. The system of claim 10, wherein processing the region of the license plate to determine the set of distortion parameters further comprises:

prior to binarizing the image data based on the optimal threshold, rotating the image of the license plate by a first rotation angle;

extracting an outline of the license plate from the second binarized image; and smoothing the outline of the license plate using Fourier descriptors.

16. The system of claim 15, wherein processing the region of the license plate to determine the set of distortion parameters further comprises fitting the outline of the license plate that was smoothed with a quadrilateral.

17. The system of claim 15, wherein the rotation angle is derived from the image of the license plate.

18. The system of claim 10, wherein the processor is further configured to perform actions comprising:

processing the region of the license plate with a histogram equalization.

* * * * *